US012726249B2

(12) United States Patent
Kim et al.

(10) Patent No.: US 12,726,249 B2
(45) Date of Patent: Sep. 1, 2026

(54) METHOD AND APPARATUS FOR TRANSMITTING AND RECEIVING CHANNEL STATE INFORMATION IN WIRELESS COMMUNICATION SYSTEM

(71) Applicant: LG ELECTRONICS INC., Seoul (KR)

(72) Inventors: Kyuseok Kim, Seoul (KR); Haewook Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 903 days.

(21) Appl. No.: 17/793,900

(22) PCT Filed: Jan. 29, 2021

(86) PCT No.: PCT/KR2021/001192
§ 371 (c)(1),
(2) Date: Dec. 6, 2022

(87) PCT Pub. No.: WO2021/154020
PCT Pub. Date: Aug. 5, 2021

(65) Prior Publication Data

US 2023/0246696 A1 Aug. 3, 2023

(30) Foreign Application Priority Data

Jan. 29, 2020 (KR) ........................ 10-2020-0010732
Feb. 20, 2020 (KR) ........................ 10-2020-0021298

(51) Int. Cl.
*H04B 7/06* (2006.01)
*H04B 7/0456* (2017.01)
(Continued)

(52) U.S. Cl.
CPC ......... *H04B 7/0663* (2013.01); *H04B 7/0478* (2013.01); *H04B 7/0626* (2013.01); *H04B 17/373* (2015.01); *H04L 5/0057* (2013.01)

(58) Field of Classification Search
CPC .. H04B 7/0663; H04B 7/0478; H04B 7/0626; H04B 17/373; H04B 7/0417;
(Continued)

(56) References Cited

U.S. PATENT DOCUMENTS

2015/0341101 A1 11/2015 Park et al.
2017/0201308 A1 7/2017 Park et al.
(Continued)

FOREIGN PATENT DOCUMENTS

CN 109561463 A * 4/2019 ............. H04B 7/024
EP 3576361 A1 * 12/2019 ........... H04B 7/0434
(Continued)

OTHER PUBLICATIONS

LG Electronics, "Discussion on overhead reduction for Type II codebook," 3GPP TSG RAN WG1 #98, R1-1908698 Aug. 2019, 15 pages.
(Continued)

*Primary Examiner* — Mohammad S Adhami
*Assistant Examiner* — Samuel Dilan Rutnam
(74) *Attorney, Agent, or Firm* — BRYAN CAVE LEIGHTON PAISNER LLP

(57) ABSTRACT

Disclosed are a method and apparatus for transmitting and receiving channel state information in a wireless communication system. A method for reporting channel state information (CSI), according to an embodiment of the present disclosure, may comprise the steps of: receiving, from a base station, configuration information related to a CSI report; receiving a CSI-reference signal (CSI-RS) from the base station; and transmitting the CSI report to the base station on
(Continued)

the basis of the configuration information and the CSI-RS. The configuration information includes information about a value of M (M is a natural number) and/or M discrete determined on the basis of a delay value obtained from an estimated uplink channel/signal, and the CSI may be generated on the basis of the valued of M and/or the M DFT vectors.

15 Claims, 13 Drawing Sheets

(51) Int. Cl.
*H04B 17/373* (2015.01)
*H04L 5/00* (2006.01)

(58) Field of Classification Search
CPC ...... H04B 7/046; H04B 7/0481; H04B 17/24; H04L 5/0057; H04L 5/0094; H04L 1/0026; H04L 1/0027; H04L 5/0051; H04L 5/0053; H04L 5/0048; Y02D 30/70
See application file for complete search history.

(56) References Cited

U.S. PATENT DOCUMENTS

2019/0044682 A1 2/2019 Hebron et al.
2019/0312696 A1 10/2019 Kim et al.
2019/0334587 A1* 10/2019 Rahman ............... H04B 7/0626
2021/0058910 A1* 2/2021 Yokomakura ......... H04L 5/0048

FOREIGN PATENT DOCUMENTS

KR 10-2018-0025941 A 3/2018
WO WO-2014019203 A1 * 2/2014 ........... H04L 5/0057
WO 2014/198037 A1 12/2014
WO WO-2020244496 A1 * 12/2020 ........... H04B 7/0639

OTHER PUBLICATIONS

Huawei, " Rel-17 work scope on NR MIMO and sub-3GHZ FDD enhancements," 3GPP TSG RAN Meeting #85, RP-191762, Sep. 2019, 12 pages.

* cited by examiner

FIG.6

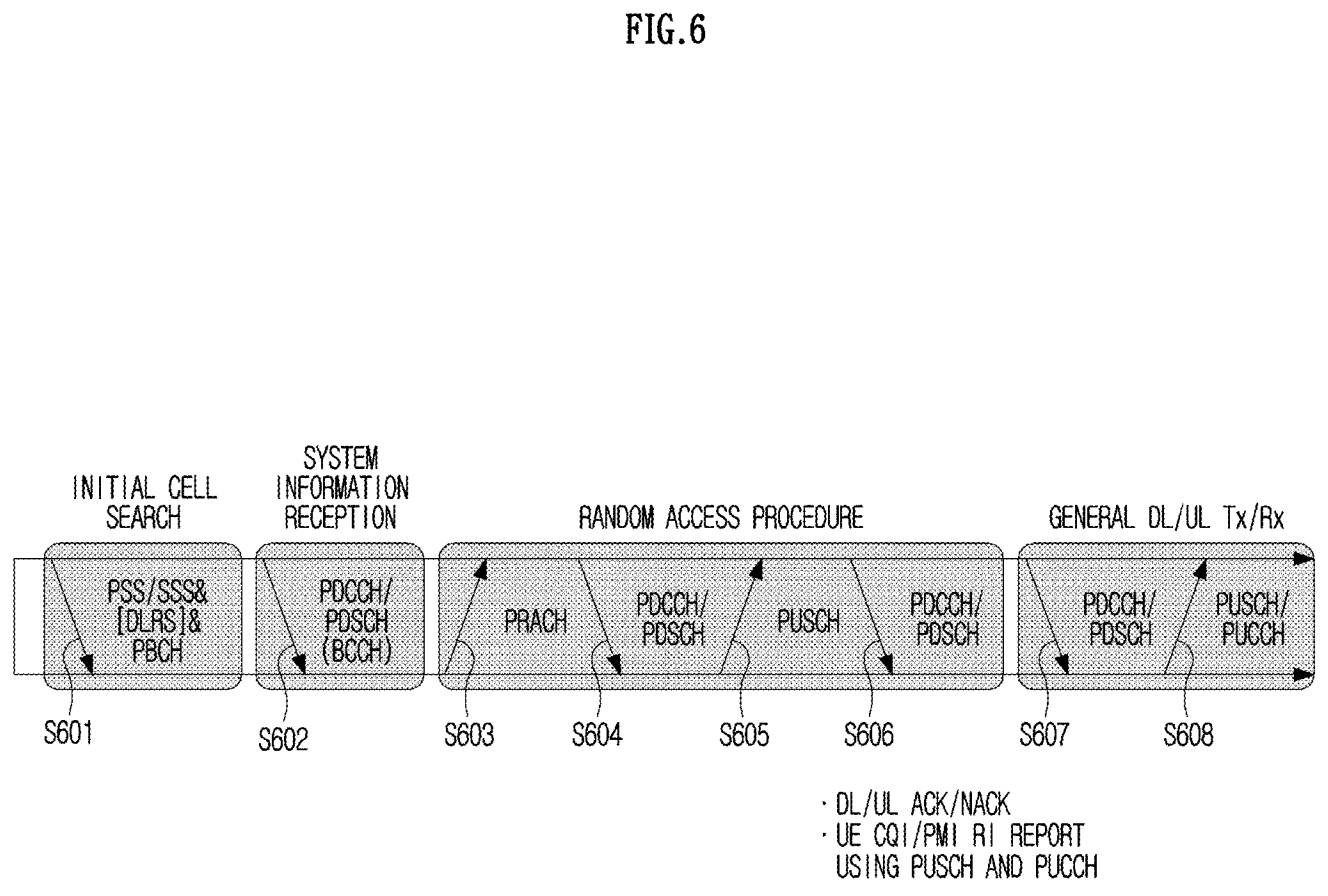

INITIAL CELL SEARCH
PSS/SSS& [DLRS]& PBCH
S601

SYSTEM INFORMATION RECEPTION
PDCCH/ PDSCH (BCCH)
S602

RANDOM ACCESS PROCEDURE
PRACH
S603
PDCCH/ PDSCH
S604
PUSCH
S605
PDCCH/ PDSCH
S606

GENERAL DL/UL Tx/Rx
PDCCH/ PDSCH
S607
PUSCH/ PUCCH
S608

· DL/UL ACK/NACK
· UE CQI/PMI RI REPORT USING PUSCH AND PUCCH

FIG.7

Port #0
Port #1
Cluster #1
Cluster #2
(a)

Power spectrum
Cluster #1
Cluster #2
delay
(b)

METHOD AND APPARATUS FOR TRANSMITTING AND RECEIVING CHANNEL STATE INFORMATION IN WIRELESS COMMUNICATION SYSTEM

This application is the National Stage filing under 35 U.S.C. 371 of International Application No. PCT/KR2021/001192, filed on Jan. 29, 2021, which claims the benefit of and priority to Korean Application No. 10-2020-0010732, filed on Jan. 29, 2020 and Korean Application No. 10-2020-0021298, filed on Feb. 20, 2020, the contents of which are all hereby incorporated by reference herein in their entirety.

TECHNICAL FIELD

The present disclosure relates to a wireless communication system, and in more detail, relates to a method and an apparatus of transmitting and receiving channel state information in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving channel state information.

In addition, an additional technical object of the present disclosure is to provide a method and an apparatus of transmitting and receiving channel state information using information on a delay domain.

The technical objects to be achieved by the present disclosure are not limited to the above-described technical objects, and other technical objects which are not described herein will be clearly understood by those skilled in the pertinent art from the following description.

Technical Solution

A method of reporting channel state information (CSI) in a wireless communication system according to an aspect of the present disclosure may include: receiving configuration information related to a CSI report from a base station; receiving a CSI-RS (CSI-reference signal) from the base station; and transmitting, to the base station, a CSI report based on the configuration information and the CSI-RS. The configuration information may include information on a value of M (M is a natural number) and/or M Discrete Fourier Transform (DFT) vectors, the value of M and/or the M DFT vectors may be determined based on a delay value obtained from an estimated uplink channel/signal, the CSI may be generated based on the value of M and/or the M DFT vectors.

A terminal of reporting channel state information (CSI) according to an additional aspect of the present disclosure may include at least one transceiver for transmitting and receiving a wireless signal and at least one processor controlling the at least one transceiver. The at least one processor may be configured to: receive configuration information related to a CSI report from a base station; receive a CSI-RS (CSI-reference signal) from the base station; and transmit, to the base station, a CSI report based on the configuration information and the CSI-RS. The configuration information may include information on a value of M (M is a natural number) and/or M Discrete Fourier Transform (DFT) vectors, the value of M and/or the M DFT vectors may be determined based on a delay value obtained from an estimated uplink channel/signal, the CSI may be generated based on the value of M and/or the M DFT vectors.

A base station of receiving channel state information (CSI) report according to an additional aspect of the present disclosure may include at least one transceiver for transmitting and receiving a wireless signal and at least one processor controlling the at least one transceiver. The at least one processor may be configured to: transmit configuration information related to a CSI report to a terminal; transmit a CSI-RS (CSI-reference signal) from to the terminal; and receive, from the terminal, a CSI report based on the configuration information and the CSI-RS. The configuration information may include information on a value of M (M is a natural number) and/or M Discrete Fourier Transform (DFT) vectors, the value of M and/or the M DFT vectors may be determined based on a delay value obtained from an estimated uplink channel/signal, the CSI may be generated based on the value of M and/or the M DFT vectors.

Preferably, the M DFT vectors may be selected from N ($N \geq M$, N is a natural number) DFT vector candidates, the N may be determined based on a size of a bandwidth configured for the terminal to report the CSI and an oversampling coefficient.

Preferably, in the configuration information, the M DFT vectors may be configured using a bitmap of size N corresponding to the N DFT vector candidates.

Preferably, in the configuration information, the M DFT vectors may be configured using a bitmap of size P corresponding to continuous P ($N \geq P \geq M$, P is a natural number) DFT vector candidates among the N DFT vector candidates.

Preferably, a starting point may be configured in the N DFT vector candidates in the configuration information, the M DFT vectors may be determined as continuous M DFT vectors starting from the starting point in the N DFT vector candidates.

Preferably, the value of M and/or the M DFT vectors may be independently configured for each antenna port of the CSI-RS in the configuration information.

Preferably, a quasi co-location (QCL) relationship for a spatial Rx parameter with a resource of an uplink channel/signal is configured for a resource of the CSI-RS, the uplink channel/signal is any one of a sounding reference signal (SRS), a physical uplink control channel (PUCCH) or a physical uplink shared channel (PUSCH).

Preferably, when an offset between a transmission time of the uplink channel/signal and a transmission time of the CSI-RS exceeds a specific value, a QCL relationship for a spatial Rx parameter with a default reference resource is configured for the resource of the CSI-RS.

Preferably, the CSI report may include a first CSI report for a first cell and a second CSI report for a second cell, a report value for wideband (WB) may be reported only in either one of the first CSI report or the second CSI report, a report value for a subband (SB) may be reported in both the first CSI report and the second CSI report.

Preferably, the CSI may be generated based on M' (M≥M', M' is a natural number) DFT vectors selected by the terminal from among the M DFT vectors.

Preferably, information on the M' DFT vectors may be transmitted to the base station.

Advantageous Effects

According to an embodiment of the present disclosure, codebook performance can be improved by transmitting and receiving channel state information using information on a delay domain.

In addition, according to an embodiment of the present disclosure, a feedback overhead of channel state information can be reduced by transmitting and receiving channel state information using information on a delay domain.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 7 is a diagram schematically illustrating an example of a channel that can utilize Type II port selection codebook.

BEST MODE

Figure 1:
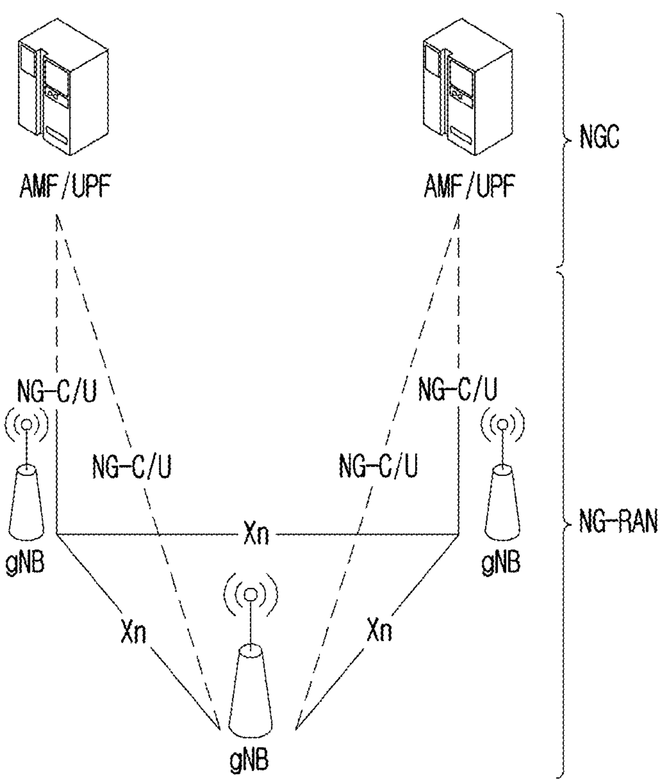
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being “connected”, “combined” or “linked” to another element, it may include an indirect connection relation that yet another element presents therebetween as well as a direct connection relation. In addition, in the present disclosure, a term, “include” or “have”, specifies the presence of a mentioned feature, step, operation, component and/or element, but it does not exclude the presence or addition of one or more other features, stages, operations, components, elements and/or their groups.

In the present disclosure, a term such as “first”, “second”, etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, “and/or”, may refer to one of related enumerated items or it means that it refers to and includes any and all possible combinations of two or more of them. In addition, “/” between words in the present disclosure has the same meaning as “and/or”, unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
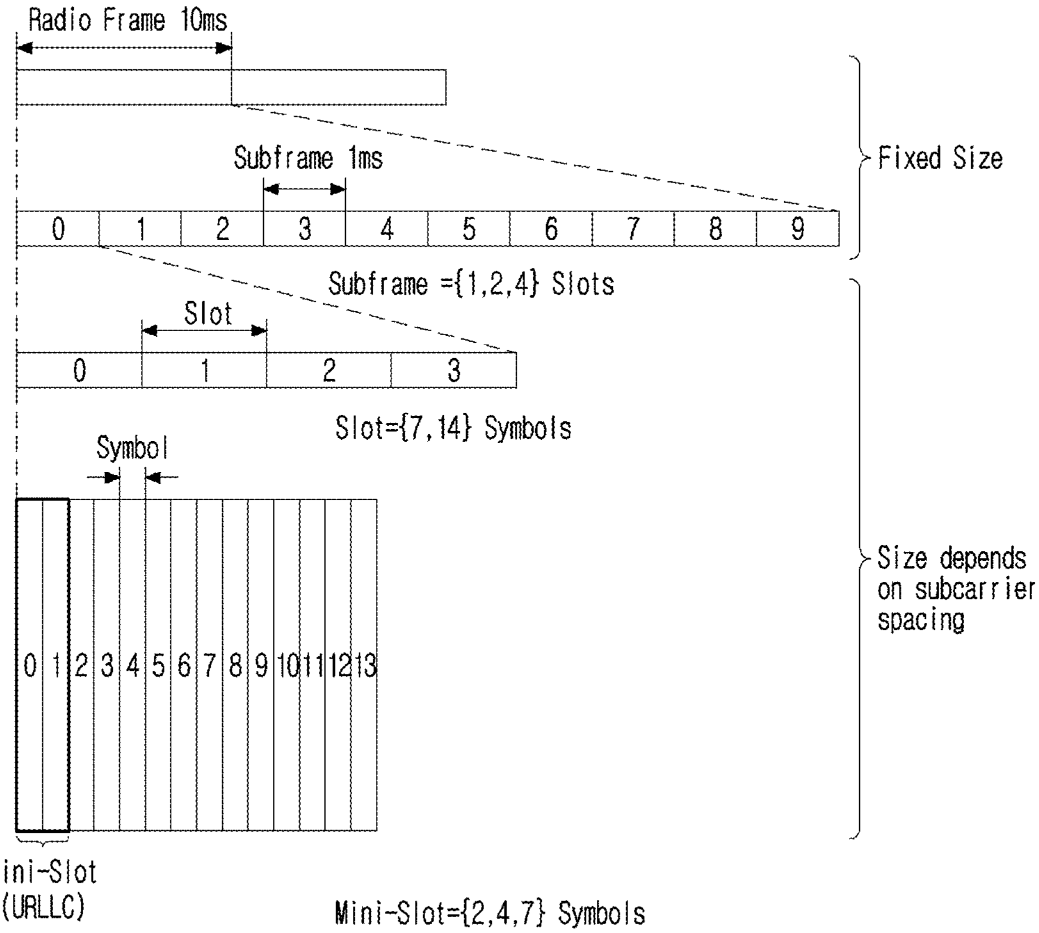
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 KHz/60 kHz, dense-urban, lower latency and a wider carrier bandwidth are supported, and when a SCS is 60 KHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz 52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration u, slots are numbered in an increasing order of $n_s^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
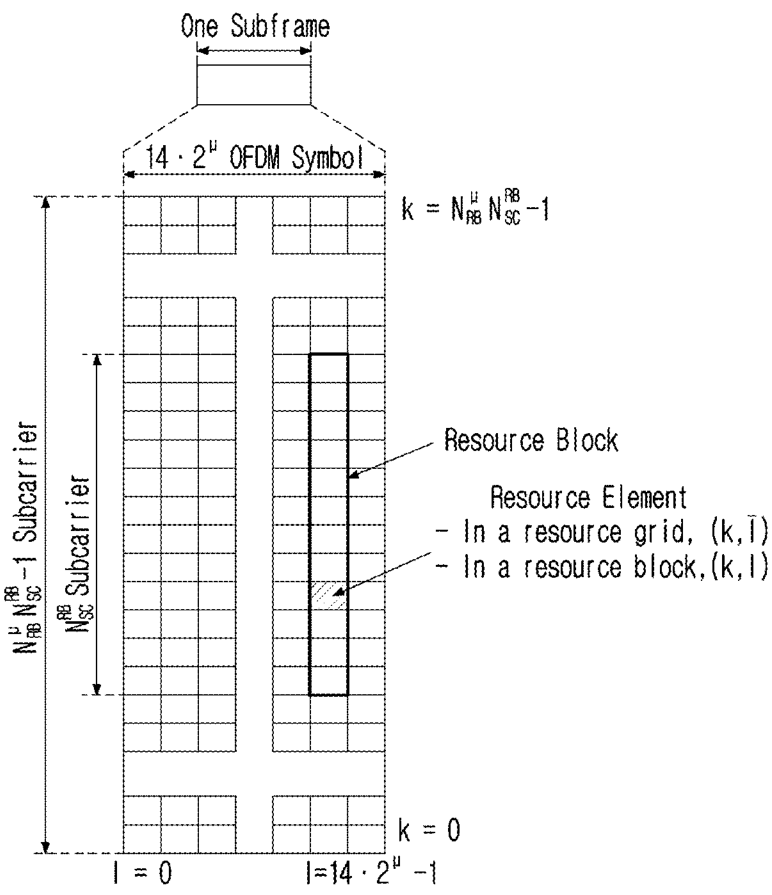
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for u and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

- offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.
- absoluteFrequencyPointA represents a frequency-position of point A expressed as in ARFCN (absolute radio-frequency channel number).

Common resource blocks are numbered from 0 to the top in a frequency domain for a subcarrier spacing configuration u. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration u in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BPW,i}^{start,\mu} \quad \text{[Equation 2]}$$

$N_{BWP,i}^{start,\mu}$ is a common resource block that a BWP starts relatively to common resource block 0.

Figure 4:
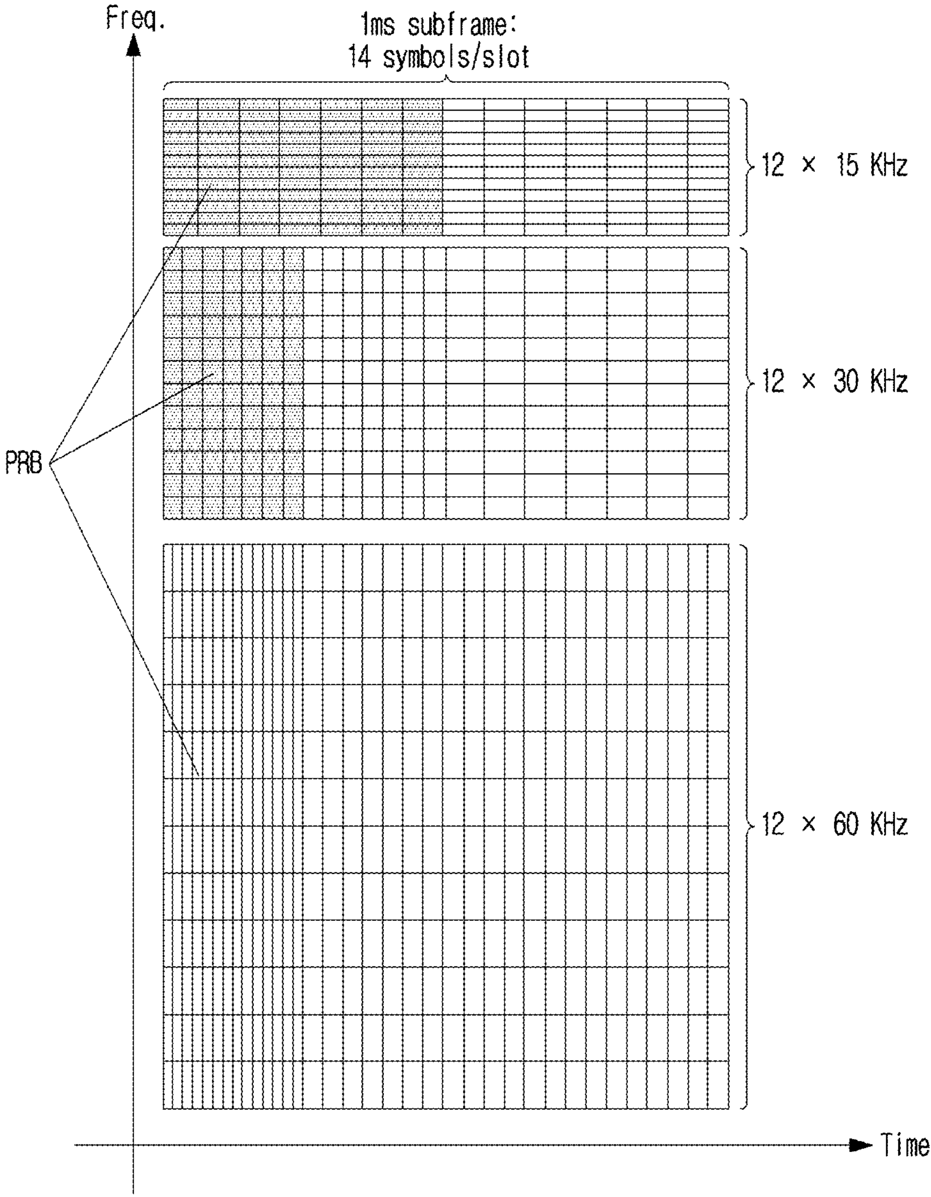
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
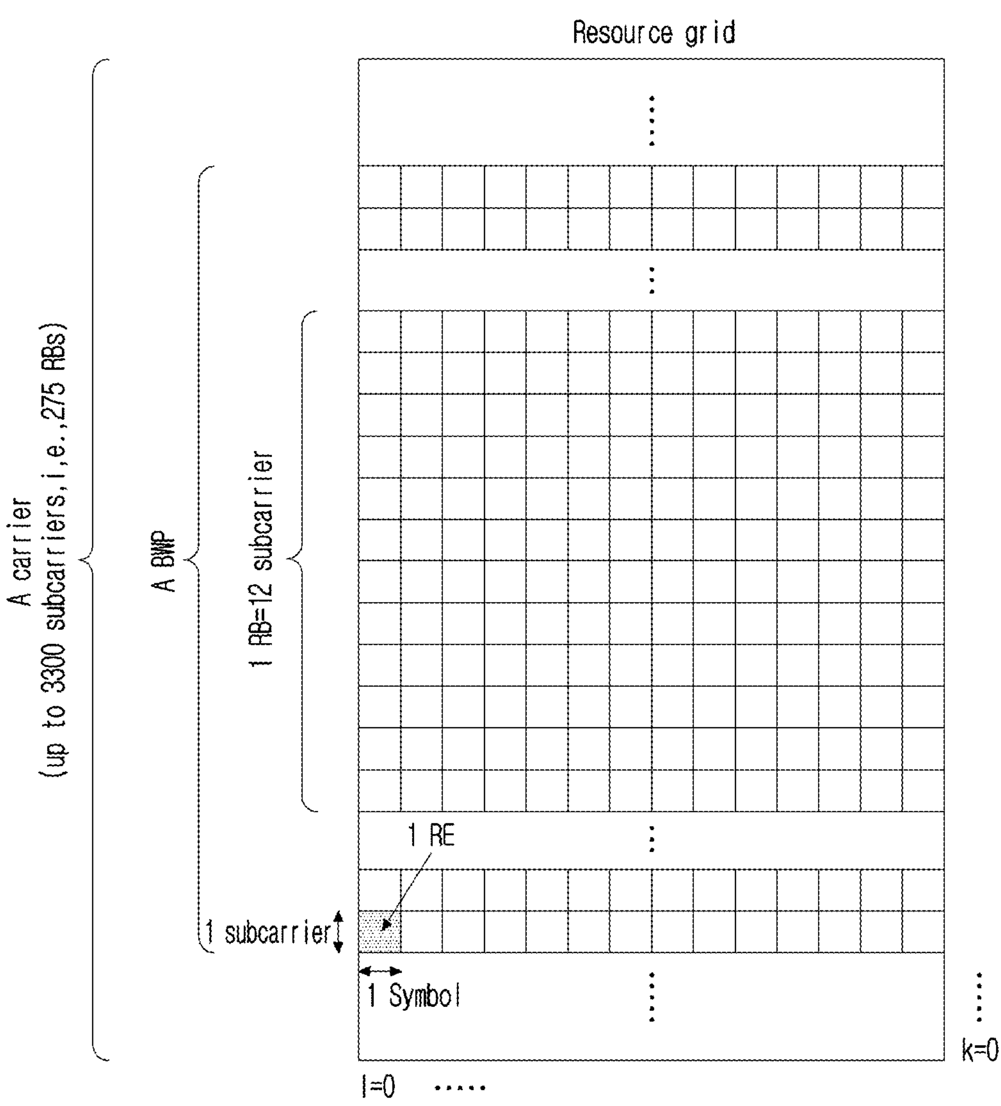
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., middle some spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource time resource allocation, allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHS or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) etc.), mapping, information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be predefined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality 4 CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource (given by a higher layer parameter setting resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-Resources ForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resourece setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For COI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig 1E.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset(Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Hereinafter, the method proposed in the present disclosure will be described in detail.

When a base station transmits data to a terminal, in order to adaptively configure an optimal number of ranks (number of transport layers)/a precoding matrix/MCS (Modulation and Coding Scheme), etc. depending on a channel between a base station and a terminal, a process of transmitting and receiving channel state information (CSI) between a base station and a terminal is required. For this, a base station may transmit a reference signal (RS) for CSI acquisition to a terminal. In addition, a terminal may receive the RS, estimate CSI based on it, and report a corresponding CSI to a base station. A base station may configure an appropriate number of ranks/precoding matrix/MCS, etc., when scheduling data to a terminal based on the CSI reported from a terminal.

When the base station can utilize reciprocity of a DL/UL channel in a process of acquiring CSI of a terminal, overhead of an RS to be transmitted by the base station to a terminal and overhead for a terminal to report CSI to the base station can be reduced and system performance can be improved based on more accurate CSI. Assuming DL/UL duplexing of FDD (Frequency domain duplexing) method, as described in TR 38.901 document (Chapter 7.6.5), which describes a channel model from 0.5 GHz to 100 GHz, angle and delay reciprocity for a DL/UL channel may be assumed. In addition, by utilizing such reciprocity, overhead generated in a CSI acquisition process may be reduced, and system performance may be improved by acquiring more accurate CSI.

The present disclosure proposes a method of transmitting and receiving CSI by utilizing angle & delay reciprocity for a DL/UL channel.

Before describing the details of the technology proposed in the present disclosure, Type II codebook introduced in Release 15/16 of 3GPP TS 38 will be briefly described.

Rel-15 Type II Codebook

Among oversampled discrete Fourier transform (DFT) vectors, L basis DFT vectors are used per specific polarization (pole). And, a precoding matrix is constructed by applying a wide band (WB) amplitude coefficient and a sub-band (SB) amplitude/phase coefficient to a corresponding basis DFT vectors. Among oversampled DFT vectors, a specific vector is $V_{i,m}$, and is defined as Equation 3 below in the standard.

$$u_m = \begin{cases} \begin{bmatrix} 1 & e^{j\frac{2\pi m}{O_2 N_2}} & \dots & e^{j\frac{2\pi m(N_2-1)}{O_2 N_2}} \end{bmatrix} & N_2 > 1 \\ 1 & N_2 = 1 \end{cases}$$
$$v_{l,m} = \begin{bmatrix} u_m & e^{j\frac{2\pi l}{O_1 N_1}} u_m & \dots & e^{j\frac{2\pi l(N_1-1)}{O_1 N_1}} u_m \end{bmatrix}^T \quad \text{[Equation 3]}$$

Here, $N_1$ and $N_2$ represent the number of antenna ports in a first dimension and a second dimension, respectively, and are configured by the higher layer parameter n1-n2-codebookSubsetRestriction. The number of CSI-RS ports ($P_{CSI-RS}$) is $2N_1N_2$. $O_1$ and $O_2$ represent oversampling factors in a first dimension and a second dimension, respectively. A configuration of ($N_1$,$N_2$) and ($O_1$,$O_2$) supported for a given number of CSI-RS ports are defined in the standard.

L represents the number of beams, and a value of L is configured by the higher layer parameter numberOfBeams. Here, L=2 when $P_{CSI-RS}$=4, and L∈{2,3,4} when $P_{CSI-RS}$>4.

Codebooks for 1 layer and 2 layers are defined in the standard, where indices $m_1^{(i)}$ and $m_2^{(i)}$ as in Equation 4 below are applied to l and m in Equation 3, respectively, a precoding matrix is constructed based on the DFT basis vector.

$$m_1^{(i)} = O_1 n_1^{(i)} + q_1$$
$$m_2^{(i)} = O_2 n_2^{(i)} + q_2 \quad \text{[Equation 4]}$$

Here, i is 0, 1, . . . , L−1. $n_1^{(i)} \in \{0, 1, \ldots, N_1-1\}$, and $n_2^{(i)} \in \{0, 1, \ldots, N_2-1\}$. $q_1 \in \{0,1, \ldots, O_1-1\}$, and $q_2 \in \{0,1, \ldots, O_2-1\}$. Values of $n_1^{(i)}$ and $n_2^{(i)}$ are determined according to an algorithm defined in the standard.

Rel-15 Type II Port Selection Codebook

It is a method of constructing a precoding matrix by substituting L basis DFT vectors specific pole with beamformed CSI-RS ports in the above-described Rel-15 Type II codebook.

Rel-16 Type II Codebook

It is a method of compressing and reporting codebook information using correlation of a frequency domain with respect to the above-described Rel-15 Type II codebook. In this case, compressed information may be configured based on a set of some vectors of an oversampled DFT codebook in order to compress codebook information. Here, a set of some vectors of an oversampled DET codebook may be referred to as 'frequency domain (FD) basis vectors'.

$M_v$ FD basis vectors are defined in the standard as in Equation 5 below.

$$\left[y_{0,l}^{(f)} y_{1,l}^{(f)}, \ldots, y_{N_3-1,l}^{(f)}\right]^T \quad \text{[Equation 5]}$$

Here, f=0, 1, . . . , $M_v$−1. $N_3$ is the total number of precoding matrices. 1=1, . . . , 0, and 0 is a rank indicator (RI) value.

As above, the t-th element of the f-th vector (here, t=0, . . . , $N_3$−1) among My FD basis vectors is $y_{t,1}^{(f)}$, and is defined in the standard as in Equation 6 below.

$$y_{t,l}^{(f)} = e^{j\frac{2\pi m_{3,l}^{(f)}}{N_3}} \quad \text{[Equation 6]}$$

Here, $n_{3,1}$ is defined in the standard as in Equation 7 below.

$$n_{3,l} = \left[n_{3,l}^{(0)}, \ldots, n_{3,l}^{(M_v-1)}\right] \quad \text{[Equation 7]}$$

$$n_{3,l}^{(f)} \in \{0, 1, \ldots, N_3 - 1\}$$

Here, f=0, 1, . . . , $M_v$−1. In the above equation, $M_v$ FD basis vector combinations selected by a terminal among oversampled DFT codebooks of size $N_3$ (i.e., among the total number of precoding matrices) through the $n_{3,1}^{(f)}$ value in the above equation may be reported to a base station.

Embodiment 1) A Method in which a Base Station Configure/Indicate a Frequency Domain (FD) Basis Vector(s) to a Terminal A base station may configure/indicate M (<=N, M is a natural number) specific DFT vectors among DFT vectors of size N (N is a natural number) to a terminal. Then, a base station may configure/indicate related information for this (e.g., N value/M value/indices of selected DFT vectors/oversampling coefficient for deriving N/related coefficients for deriving the information, etc.) to a terminal through higher layer signaling and/or DCI signaling.

A terminal may report CSI-related information (e.g., rank indicator (RI), precoding matrix indicator (PMI), etc.) to a base station based on the M specific DFT vectors.

In the above-described method, an example of 'DFT vectors of size N' is shown in Equation 8 below.

$$[e^{j2\pi(0)n/N} \ldots e^{j2\pi(N-1)n/N}]^T \text{ where } n=0, \ldots, N-1 \quad \text{[Equation 8]}$$

In Equation 8, 'size N' may be defined as N=Z×R based on size Z and oversampling coefficient R. Here, size Z may mean a size (e.g., the number of RBs, etc.) of a band configured for a terminal to report/measure CSI.

In the above-described method, 'M specific DFT vectors' may be configured by selecting M different n values in Equation 8 above. That is, various 'M specific DFT vectors' may be configured according to how M different n values are selected. Here, in the present disclosure, M values of n are not necessarily limited to continuous values, also they are not limited to values having a specific pattern.

As described above, in the current Rel-16 standard, a base station may configure the number of FD basis vectors ($M_v$) per specific rank (i.e., RI) to a terminal to configure the Type II (port selection) codebook. However, $M_v$ FD basis vectors to be actually applied among all N3 vector candidates are defined so that a terminal reports to a base station based on downlink channel information.

On the other hand, the present disclosure proposes a method in which a base station directly configures/indicates information on an FD basis vector combination to a terminal. That is, a base station may configure/indicate M (<=N) specific DFT vectors among DFT vectors of size N to a terminal. Here, M DFT vectors configured/indicated to a terminal may correspond to the FD basis vector combination. When delay reciprocity of a DL/UL channel between a base station and a terminal can be assumed, based on a UL channel estimated based on a signal transmitted by a terminal, such as a sounding reference signal (SRS), a base station may directly configure an FD basis vector combination to a terminal. The reason is that a delay on a time axis of a channel can appear as a phase rotation on a frequency axis. Equation 9 below shows an example of such a characteristic. [Equation 9]

$$h(k) = \sum_{n=0}^{N_{path}-1} \sum g_n e^{\frac{j2\pi k\delta_n}{N_{FFT}}}$$

where $g_n$ and $\delta_n$ is the channel gain and time delay, respectively

Equation 9 shows an example of a channel coefficient value in the k-th subcarrier. As shown in Equation 9, a channel coefficient (h(k)) for an entire band (k=0, . . . , $N_{FFT}$−1) may be expressed by $N_{path}$ FD basis vectors and an amplitude/phase coefficient ($g_n$) corresponding to the vectors. $N_{path}$ FD basis vectors are represented in Equation 10 below.

$$[e^{j2\pi(0)\delta_n/N_{FFT}} \; . \; . \; . \; e^{j2\pi(N_{FFT}-1)\delta_n/N_{FFT}}]^T \text{ where } n=0, \ldots, N_{path}-1 \quad \text{[Equation 10]}$$

As shown in the above equation for the FD basis vector, each FD basis vector has a characteristic determined according to a value of $\delta_n$, which is a delay value of a channel, among all $N_{FFT}$ vector candidates. Accordingly, as described above, a base station may select an FD basis vector combination based on a delay value estimated from a UL channel, and may directly configure/indicate the selected FD basis vector combination to a terminal. Here, a base station may use higher layer signaling (e.g., RRC and/or MAC CE) and/or DCI signaling to configure/indicate the FD basis vector combination to a terminal.

Hereinafter, a method in which a base station configures/indicates an FD basis vector combination to a terminal will be described. The embodiment described below may be one of the methods for applying the proposed method, and it is obvious that it is not limited to the only method for applying the proposed method.

A method in which a base station configure/indicate an FD basis vector to a terminal 1) a base station may directly configure/indicate M specific DFT vectors to be applied when a terminal reports CSI-related information (e.g., RI, PMI, etc.) to a base station, to a terminal.

A1-1) A bitmap of size N may be defined for N DFT vector candidates. N DFT vector candidates may correspond to DFT vectors when n has a value from 0 to N−1 in Equation 8 above, and each DFT vector candidate may be sequentially one-to-one to each bit of a bitmap. Here, an order of each DFT vector candidate mapping to each bit of a bitmap may be such that DFT vector candidates are mapped in ascending order of n from 0 to N−1, from the most significant bit (MSB) (or left-most bit) to the least significant bit (LSB) (or right-most bit) of the bitmap, or vice versa.

In addition, a base station may configure/indicate M DFT vectors to a terminal by using the bitmap using higher layer signaling (e.g., RRC and/or MAC CE) and/or DCI signaling. For example, if a specific bit value in a bitmap is 1, it may be interpreted that a DFT vector corresponding to the bit belongs to the M DFT vectors, or vice versa.

A1-2) For N DFT vector candidates, a bitmap (i.e., a bitmap having a size of P) corresponding to P less than or equal to N may be defined. Here, P≥M. A base station may configure/indicate M DFT vectors to a terminal by using the bitmap using higher layer signaling (e.g., RRC and/or MAC CE) and/or DCI signaling. A method of constructing a bitmap of size P may be the same as the method of constructing a bitmap of size N described above except for a bitmap size.

The bitmap corresponding to P may mean P consecutive DFT vectors among N DFT vector candidates. Here, P DFT vector candidates may correspond to the DFT vectors according to P consecutive n values in Equation 8. That is, each bit of a bitmap of size P may correspond to each DFT vector among P consecutive DFT vectors.

The consecutive P DFT vectors may be defined by a predetermined rule between a base station and a terminal, or may be configured/indicated to a terminal (e.g., configure/indicate a starting point (i.e., a specific n value)), etc.) by a base station.

A1-3) A size of M may be determined by a predetermined rule between a base station and a terminal or may be configured to a terminal based on higher layer signaling (e.g., RRC/MAC CE). A starting point (i.e., a specific n value) for M DFT vectors among N candidates may be configured/indicated to a terminal using higher layer signaling (e.g., RRC and/or MAC CE) and/or DCI signaling. In this case, M DFT vectors may be defined/determined as DFT vectors continuous from a starting point (e.g., DFT vectors when n has a value from (a value configured as a starting point) to M−(a value configured as a starting point)).

2) A base station may configure/indicate information on N', less than or equal to N, DFT vector candidates from among all N DFT vector candidates that can be applied when a terminal reports CSI-related information (e.g., RI, PMI, etc.) to a base station, to a terminal. In addition, a terminal may report M specific DFT vectors actually applied by the terminal among N' DFT vector candidates to a base station.

A2-1) In the proposed methods of No. 2, as a method in which a base station configure/indicate information on N', less than or equal to N, candidates among all N candidates, the proposed method described in the above-mentioned No. 1 (i.e., A1-1/A1-2/A1-3) may be applied. That is, the proposed method described in No. 1 (A1-1/A1-2/A1-3) assumes that M specific DFT vectors are directly indicated, but when M is interpreted as N', the proposed method described in the above-mentioned No. 1 (i.e., A1-1/A1-2/A1-3) may be applied for the proposed method of No. 2.

When the above-described embodiment 1 is applied, since a terminal may not report which DFT vectors to use as an FD basis vector to a base station, an advantage of reducing feedback overhead can be obtained.

The above-described proposed methods (A1-1/A1-2/A1-3/A2-1) may be an example of the methods for applying the embodiment 1, and it is obvious that the proposed methods are limited to the only methods for applying the embodiment 1.

Embodiment 1-1: Configuring Method for Each Antenna Port

For embodiment 1 above, the number M of specific DFT vectors and/or the selected M DFT vectors may be configured/indicated to have different values depending on a corresponding port (e.g., beamformed CSI-RS port). That is, the number M of specific DFT vectors and/or the selected M DFT vectors may be independently configured/indicated for each RS antenna port (e.g., CSI-RS antenna port).

With respect to embodiment 1 above, embodiment 1-1 may be interpreted that a delay value for each port/the number of delays/a window size for each delay can be independently configured/indicated to a terminal. When a base station configures/indicates the values to a terminal, it may be defined to consider only the strongest delay(s).

In order to apply the proposal, the methods (A1-1/A1-2/A1-3/A2-1) described in embodiment 1 above may be extended by the number of ports configured/indicated to a terminal.

In case of Type II port selection codebook, L ports (e.g., beamformed CSI-RS ports) per specific polarization (pole) are applied instead of a DFT vector. In this case, when a base station can determine a spatial domain characteristic of a DL channel (e.g., an angle value of a channel, etc.) based on a UL channel, after transmitting a reference signal (RS) by forming a beam in a corresponding direction, it may be utilized to report and receive detailed amplitude/phase coefficients for configuring a precoding matrix from a terminal. In other words, in case of Type II port selection codebook, ports that can correspond to a specific beam and amplitude/phase coefficients corresponding to the corresponding ports may be configured.

Figure 7:
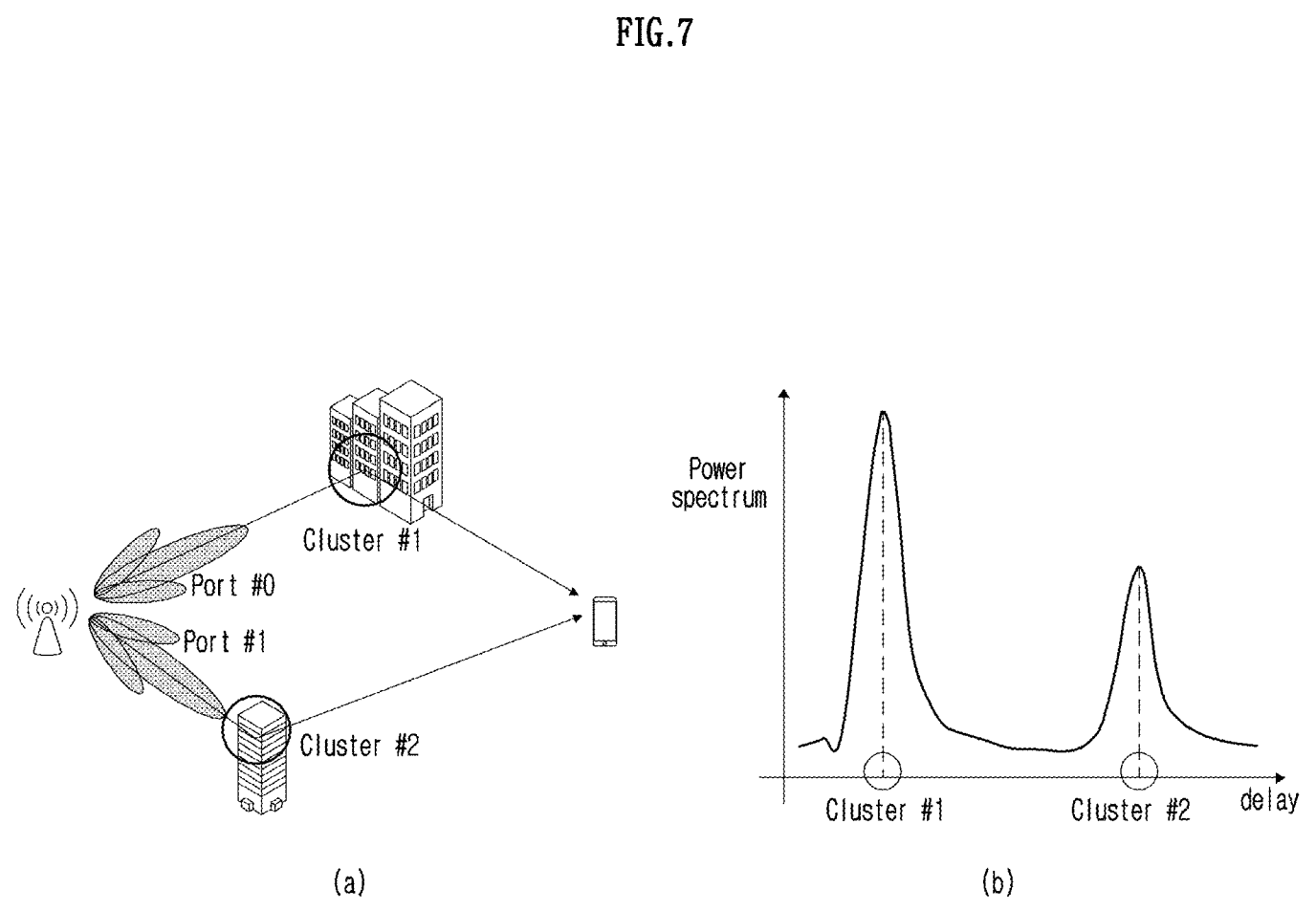

FIG. 7 is a diagram schematically illustrating an example of a channel that can utilize Type II port selection codebook.

With referring to FIG. 7, a base station may acquire information (e.g., angle/delay, etc.) on cluster #1/2 by estimating a UL channel based on an SRS or the like. In other words, a base station may transmit beamformed CSI-RSs in each direction. In addition, a terminal may derive amplitude/phase coefficients for each beamformed CSI-RS port (port #0/1) based on the RS, and report it to a base station. In Rel-16 Type II port selection codebook, it is defined that a terminal reports amplitude/phase coefficients to a base station based on the same number of FD basis vectors for different ports. For example, in the channel shown in FIG. 7, it may be interpreted that two FD basis vectors corresponding to cluster #1 and cluster #2 are defined, and amplitude/phase coefficients corresponding to two FD basis vectors are reported for each port.

Meanwhile, based on the above-described embodiment 1, a base station may configure/indicate M specific DFT vectors to be applied as the FD basis vector to a terminal based on delays corresponding to cluster #1/2 to the terminal. Through this, since a terminal may not report which DFT vectors to use as the FD basis vector to a base station, an advantage of reducing feedback overhead can be obtained.

However, despite these advantages, if the number of oversampling is increased to perform more detailed precoding in a frequency domain, a channel is also subdivided in a time domain. Accordingly, the number (M) of DET vectors to be configured/indicated to a terminal for configuring/indicating the FD basis vector increases. As a result, an amount of information that a terminal needs to report to a base station also increases as M increases. As a method for overcoming these disadvantages, the above-described embodiment 1-1 may be applied. That is, the number M of specific DFT vectors and/or selected M DFT vectors may have different values configured/indicated according to a corresponding port (e.g., a beamformed CSI-RS port).

Figure 8:
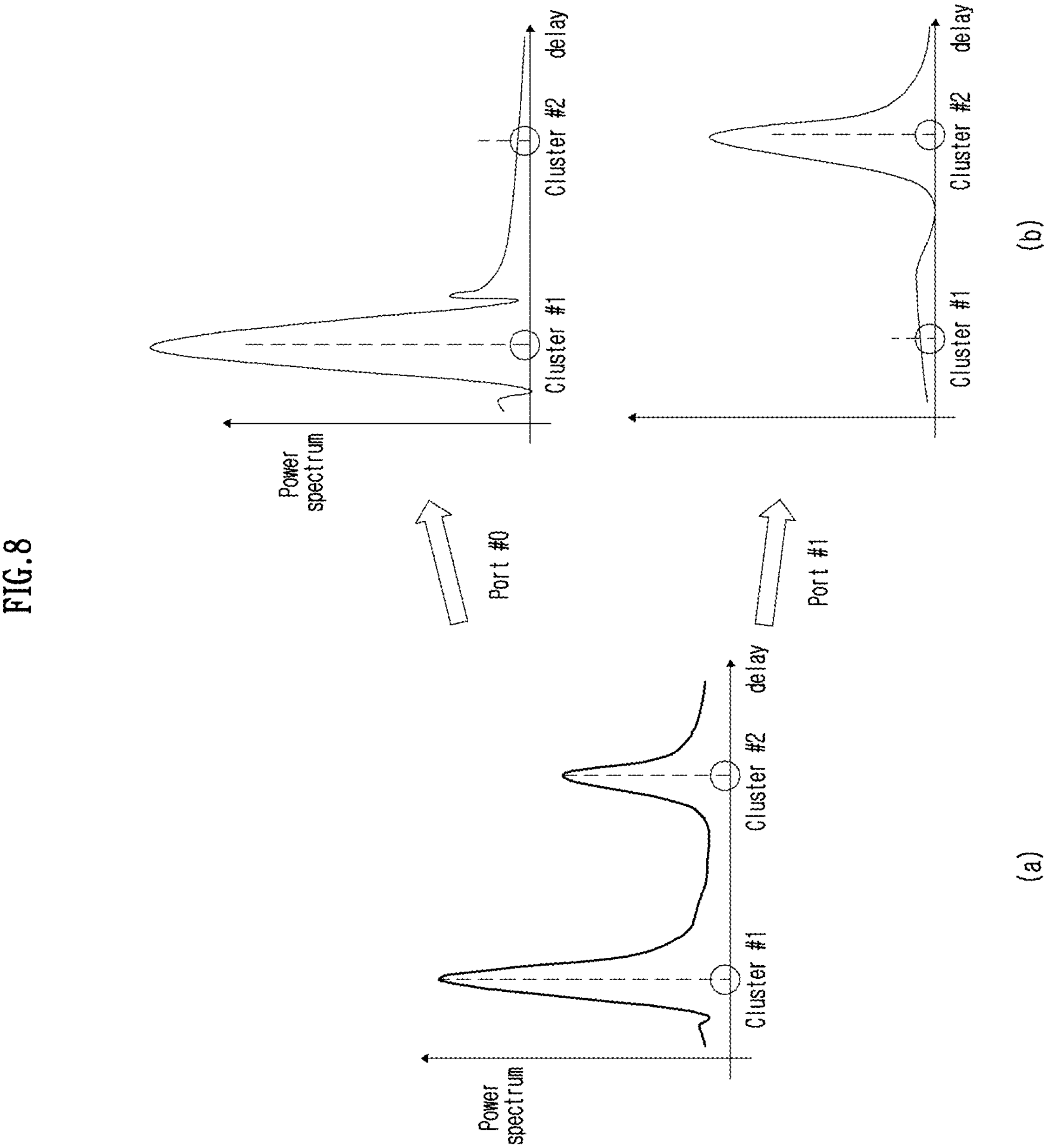
FIG. 8 is a diagram illustrating a change in a channel when an embodiment of the present disclosure is applied.

FIG. 8 is a diagram illustrating a change in a channel when an embodiment of the present disclosure is applied.

FIG. 8 illustrates an example of a channel before beamforming and a channel after transmission beamforming (TX beamforming) of a base station. FIG. 8(*a*) illustrates a channel between a base station and a terminal before beamforming. On the other hand, FIG. 8(*b*) illustrates a channel changed according to beamforming of a base station. In FIG. 8, a channel for Port #0 shows an example of a channel when beamforming is performed in a direction of cluster #1, and a channel for port #1 shows an example of a channel when beamforming is performed in a direction of cluster #2.

As shown in FIG. 8, it can be expected that a power spectrum of a cluster in a beam direction increases due to beamforming of a base station, whereas a power spectrum of a cluster having a different beam direction decreases. This trend can be expected to be more pronounced when a beam width of a base station is reduced. Meanwhile, due to the above-described characteristics, different ports may eventually correspond to different clusters, and it may be efficient for different ports to have different combinations of FD basis vectors according to delay characteristics of a cluster.

As described above, a specific port (beamformed CSI-RS port) may correspond to a specific direction (or cluster). Therefore, it can also correspond to specific delay(s) corresponding to a corresponding direction (or cluster). A base station may independently configure/indicate the number M of specific DFT vectors and/or M different DFT vectors for an FD basis vector combination of a terminal for each port (e.g., beamformed CSI-RS port) based on these characteristics.

In this case, since the number of oversampling is increased in order to perform more detailed precoding in a frequency domain and thus different FD basis vectors can be configured/indicated for each port even when a channel is subdivided in a time domain, an increase in an amount of information that a terminal needs to report to a base station can be prevented/relieved, and performance improvement can be expected by utilizing frequency selectivity.

Meanwhile, the above-described embodiment 1/1-1 may be limitedly applied to a case in which a DL carrier and a UL carrier constituting one component carrier (CC) are within a specific frequency range (e.g., the same band). And/or it may be limitedly applied when a terminal reports (e.g., when a terminal reports that a reception antenna/radio frequency (RF) (or Rx (reception) beamformer configuration) configuration and a transmission antenna/RF configuration (or Tx (transmission) beamformer configuration) for a corresponding DL-UL pair are the same/similar) to a base station that it supports a specific terminal characteristic (e.g., the proposed operation of embodiment 1/1-1, or FDD reciprocity, etc.).

Embodiment 1-2: A Reception Beam Configuration Method for a Terminal to Receive a CSI-RS When a base station transmits a CSI-RS for CSI measurement of a terminal to the terminal, SRS information (e.g., SRS resource identifier (ID)/UL BWP ID/UL CC ID, etc.) related to a reception beam configuration for a terminal to receive a CSI-RS and/or PUCCH/PUSCH resource information (e.g., PUCCH resource ID/PUCCH-SpatialRelationInfoId, etc.) may be configured/indicated.

Here, the above-described embodiment 1-2 may be limitedly applied to a case in which a DL carrier and a UL carrier constituting one CC are within a specific frequency range (e.g., the same band). And/or it may be limitedly applied when a terminal reports (e.g., when a terminal reports that a reception antenna/radio frequency (RF) (or Rx (reception) beamformer configuration) configuration and a transmission antenna/RF configuration (or Tx (transmission) beamformer configuration) for a corresponding DL-UL pair are the same/similar) to a base station that it supports a specific terminal characteristic (e.g., the proposed operation of embodiment 1/1-1, or FDD reciprocity, etc.).

The following shows a method, which is described in TS38.214 to the UE, in which a base station configures/indicates a terminal to receive information for a terminal to receive a CSI-RS, when a base station transmits a CSI-RS for CSI measurement.

For one CSI-RS resource in NZP-CSI-RS-ResourceSet configured without higher layer parameter trs-Info and without higher layer parameter repetition, a terminal expects that TCI-State to indicate one of the following quasi co-location (QCL) type(s):

- 'QCL-TypeA' with one CSI-RS resource in NZP-CSI-RS-ResourceSet in which higher layer parameter trs-Info is configured and, when applicable, 'QCL-TypeD' with the same CSI-RS resource, or
- 'QCL-TypeA' with one CSI-RS resource in NZP-CSI-RS-ResourceSet in which higher layer parameter trs-Info is configured and, when applicable, 'QCL-TypeD' with an SS/PBCH block, or
- 'QCL-TypeA' with one CSI-RS resource in NZP-CSI-RS-ResourceSet in which higher layer parameter trs-Info is configured, and when applicable, 'QCL-TypeD' with one CSI-RS resource in NZP-CSI-RS-ResourceSet in which higher layer parameter repetition is configured, or
- When 'QCL-TypeD' is not applicable, 'QCL-TypeB' with one CSI-RS resource in NZP-CSI-RS-ResourceSet in which higher layer parameter trs-Info is configured.

Here, 'QCL-TypeD' means information on a reception beam of a terminal (i.e., spatial reception parameter (Spatial Rx parameter)) as defined in the standard. That is, it can be interpreted as meaning to apply the same Spatial Rx parameter as when receiving a RS configured to QCL-TypeD.

According to the present embodiment, a base station may apply SRS information (e.g., SRS resource ID/BWP ID, etc.) to configure/indicate reception beam information to be applied when a terminal receives a CSI-RS for CSI measurement). That is, specific SRS information may be configured/indicated in the QCL-TypeD. In other words, QCL-TypeD with a specific SRS (resource) may be configured/indicated for a CSI-RS (resource).

When SRS information is configured/indicated in QCL-TypeD, a terminal may interpret it as meaning to receive a CSI-RS with a transmission beam (e.g., spatial transmission parameter (Spatial Tx parameter)/spatial domain transmission filter, etc.) and the same beam (e.g., Spatial Rx parameter) applied when transmitting the corresponding SRS.

In the proposed method, a method of configuring/indicating specific SRS information in QCL-TypeD was described, this may be interpreted as an example for performing an operation proposed in this embodiment, and it is obvious that the operation is not limited to the only operation.

As an example of another method, an SRS may be added as a spatial RS, associated RS, quasi-co-beam RS, or TCI (transmission configuration indication) for a corresponding CSI-RS. The methods for supporting embodiment 1-2 described above may have a feature that information on a specific SRS resource may be utilized for receiving a specific CSI-RS resource.

As described above, when SRS information transmitted by a terminal is used for CSI-RS reception for CSI measurement, the following advantages can be obtained.

In order to configure a spatial domain transmission filter for transmitting an SRS, a terminal may refer to SRS-SpatialRelationInfo configured in units of SRS resources. A RS that can be configured in SRS-SpatialRelationInfo includes SSB/NZP CSI-RS/SRS. A base station should change a value of SRS-SpatialRelationInfo by using RRC signaling in order to change a spatial domain transmission filter applied by a terminal to SRS transmission.

Meanwhile, a base station may configure reception beam related information to a terminal through QCL-TypeD configuration for each CSI-RS resource for CSI-RS reception for CSI measurement of a terminal. A base station should change a value of the QCL-TypeD by using RRC signaling in order to change a spatial domain reception filter applied when a terminal receives a CSI-RS.

Meanwhile, when SRS information can be used for the QCL-TypeD configuration as in the above-described embodiment 1-2, by changing only SRS-SpatialRelationInfo configured in an SRS resource, reception beam information to be applied to CSI-RS reception may also be changed at once (together). That is, there is no need to separately change a value of the QCL-TypeD.

Accordingly, there is an advantage in that signaling overhead and latency for changing a reception/transmission beam of a terminal can be reduced. In addition, in consideration of DL/UL channel reciprocity in FDD, since a base station can transmit a CSI-RS based on a specific SRS resource transmitted by a terminal, the present embodiment 1-2 may be useful in such an environment.

Embodiment 1-2-1: Default Reference Resource Configuration

It is assumed that a QCL-TypeD RS (reference resource) of a specific CSI-RS resource is configured as specific SRS information (or PUCCH/PUSCH resource information) (i.e., the above embodiment 1-2). Here, if an offset between the (most recent) transmission time of the SRS corresponding to specific SRS information and the (most recent) transmission time of the specific CSI-RS resource exceeds a specific value (e.g., threshold A), when receiving the specific CSI-RS resource, it may be assumed a QCL-TypeD RS as a ‘default reference resource’.

Here, a ‘default reference resource’ may correspond to any one of a specific CSI-RS resource (e.g., a CSI-RS resource for channel measurement (CM), a CSI-RS resource for beam management (BM), TRS, etc.)/SSB/SRS/PUCCH/PUSCH resource.

In this embodiment, a case in which a QCL-TypeD RS of a specific CSI-RS resource is configured as specific SRS information may be interpreted as follows. That is, this may be a case in which, after a base station estimates a UL channel based on the specific SRS information, the base station configures a beamformed CSI-RS port based on this, and also performs (obtains) CSI feedback based on the beamformed CSI-RS port. In this case, a difference between a UL channel measured by a base station through an SRS and a DL channel that a terminal can measure through a CSI-RS may be outdated as an interval between the time at which a base station receives the SRS and the time at which the CSI-RS is transmitted increases. As such, when a large difference occurs between the transmission time of a specific SRS configured as a QCL-TypeD RS of a CSI-RS resource and the actual transmission time of a CSI-RS, a base station may use another UL signal (e.g., other SRS/PUCCH/PUSCH, etc.) to configure a beamformed CSI-RS port corresponding to the CSI-RS. In this case, a QCL-TypeD RS of the CSI-RS resource should be able to be configured with a UL signal used for configuring a beamformed CSI-RS port. According to this embodiment, when an offset for the transmission time of an SRS and the transmission time of a CSI-RS exceeds a specific value as described above, a terminal may be configured/indicated by a base station to transmit a specific RS before a CSI-RS is transmitted. In addition, the specific RS may be configured as a QCL-TypeD RS of a CSI-RS resource. Based on this embodiment, it is possible to minimize a mismatch between a UL channel and a DL channel.

Embodiment 2

For a reporting setting configured in a different cell (or carrier), it is possible to reduce CSI feedback overhead for reporting settings based on an association of CSIs for each reporting setting.

Table 6 exemplifies some of the reporting setting (e.g., CSI-ReportConfig) parameters.

TABLE 6

```
-- ASN1START
-- TAG-CSI-REPORTCONFIG-START
CSI-ReportConfig ::=                    SEQUENCE {
    reportConfigId                          CSI-ReportConfigId,
    carrier                                 ServCellIndex              OPTIONAL,   --
  Need S
    resourcesForChannelMeasurement          CSI-ResourceConfigId,
    csi-IM-ResourcesForInterference         CSI-ResourceConfigId       OPTIONAL,   --
  Need R
    nzp-CSI-RS-ResourcesForInterference     CSI-ResourceConfigId       OPTIONAL,   --
  Need R
    reportConfigType                        CHOICE {
        periodic                                SEQUENCE {
            report SlotConfig                       CSI-ReportPeriodicityAndOffset,
            pucch-CSI-ResourceList                  SEQUENCE (SIZE (1..maxNrofBWPs)) OF
  PUCCH-CSI-Resource
        },
```

TABLE 6-continued

```
        semiPersistentOnPUCCH                          SEQUENCE {
            report SlotConfig                              CSI-ReportPeriodicityAndOffset,
            pucch-CSI-ResourceList                         SEQUENCE (SIZE (1..maxNrofBWPs)) OF
PUCCH-CSI-Resource
        },
```

Referring to Table 6, a reporting setting is connected to a specific serving cell (refer to a carrier field). Here, when calculating/obtaining/reporting DL CSI based on FDD reciprocity, this reciprocity characteristic may be similarly applied to a plurality of cells. In this case, CSI for a plurality of cells may have mutual similarity, and based on this, overhead in CSI feedback for different cells may be reduced.

For example, when reporting settings for cell #1/cell #2 are defined as report #1/report #2, respectively, it may be assumed that CSIs of report #1 and report #2 are the same. In this case, it may be defined/configured to report only CSI corresponding to a specific report among reports #1/#2. And/or, it is assumed that report values corresponding to wideband (WB) are the same for report #1/#2, and the WB CSI may be reported only in CSI corresponding to a specific report among the two reports. Here, a report value corresponding to a subband (SB) may be reported for each report #1/#2.

Figure 9:
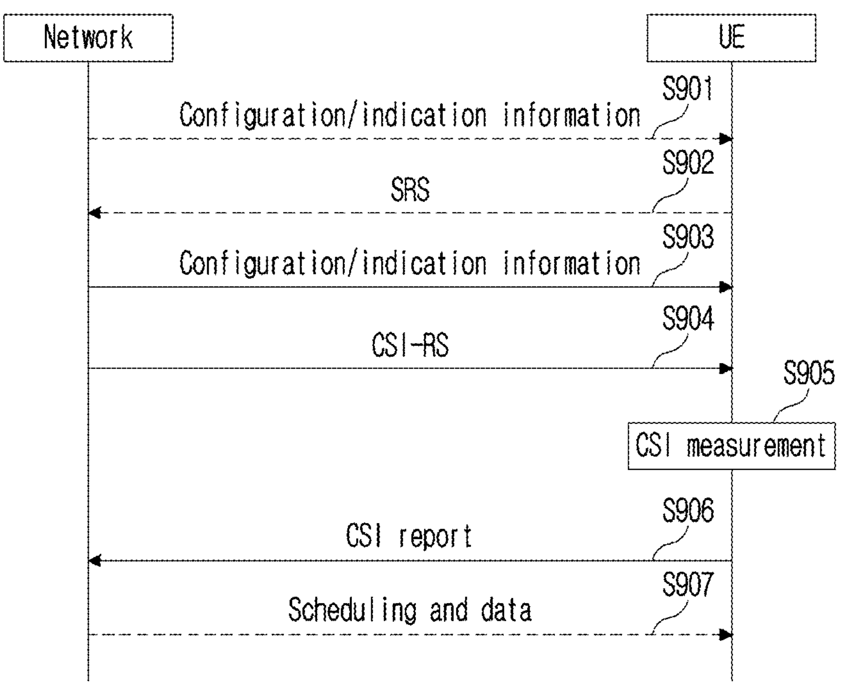
FIG. 9 is a diagram illustrating a signaling method between a network and a terminal for transmission and reception channel state information according to an embodiment of the present disclosure.

FIG. 9 is a diagram illustrating a signaling method between a network and a terminal for transmission and reception channel state information according to an embodiment of the present disclosure.

FIG. 9 illustrates signaling between a network and a UE in a situation of methods proposed in the present disclosure (Embodiment 1 (1-1/1-2) and Embodiment 2 described above). Here, a UE/network is just an example, and may be implemented with a variety of devices. FIG. 9 is just for convenience of a description of the present disclosure, and it does not limit a scope of the present disclosure. In addition, some step(s) shown in FIG. 9 may be omitted according to a situation and/or a configuration, etc.

Referring to FIG. 9, a UE may receive configuration/indication information related to SRS transmission from a network (S901), and a UE may transmit an SRS to a network based on configuration/indication information related to SRS transmission. (S902).

The above-described step of FIG. 9 may be implemented by a first device 100 and a second device 200 of FIG. 12 or a vehicle 100 of FIG. 13 to be described below. A UE may be implemented with a first device 100, and a network may be implemented with a second device 200, and vice versa. For example, referring to FIG. 12, one or more processors 102/202 may control one or more transceivers 106/206 and/or one or more memories 104/204, etc. to receive configuration/indication information related to SRS transmission and to transmit an SRS, and the one or more transceivers 106/206 may receive configuration/indication information related to SRS transmission from a network and transmit an SRS.

A network transmits configuration/indication information related to a CSI resource/measurement/report of a UE (S903).

Here, configuration/indication information related to a CSI resource/measurement/report may be generated/determined based on the SRS received in step S902 above. Alternatively, configuration/indication information related to a CSI resource/measurement/reporting may be generated/determined based on an uplink channel (e.g., PUCCH, PUSCH) other than an SRS, in this case, steps S901 and S902 may be omitted.

Configuration/indication information related to a CSI resource/measurement/report may include information on the above-described proposed method (e.g., Embodiment 1/1-1/1-2).

For example, as described in Embodiment 1 above, the configuration information related to the CSI resource/measurement/report may include information on a value of M (M is a natural number) and/or M DFT vectors.

Here, a value of M and/or M DFT vectors may be selected/determined based on a delay value obtained from a uplink channel/signal estimated within N (N≥M, N is a natural number) DFT vector candidates. N may be determined based on a size of a band configured for a UE to report the CSI and an oversampling coefficient.

In addition, as described in Embodiment 1 above, the M DFT vectors may be configured/indicated by using a bitmap of size N corresponding to the N DFT vector candidates in the configuration information related to the CSI resource/measurement/report. Alternatively, the M DFT vectors may be configured/indicated by using bitmap of size P correspond to consecutive P (N≥P≥M, P is a natural number) DFT vector candidates among the N DFT vector candidates in the configuration information related to the CSI resource/measurement/report. Alternatively, a starting point may be configured/indicated in the N DFT vector candidates in the configuration information related to the CSI resource/measurement/report, and the M DFT vectors may be determined as consecutive M DFT vectors starting from the starting point in the N DFT vector candidates.

In addition, as described in Embodiment 1-1 above, the configuration information related to the CSI resource/measurement/report may include information on a value of M (M is a natural number) and/or M DFT vectors independently for each antenna port of a CSI-RS.

In addition, as described in Embodiment 1-2 above, in order to configure a reception beam for CSI-RS reception (e.g., a quasi co-location (QCL) relationship is configured for a spatial Rx parameter), resource information of an uplink channel/signal may be configured/indicated. The resource information of the uplink channel/signal for configuring the reception beam for the CSI-RS may be included in the configuration information related to the CSI resource/measurement/report. Here, when an offset between the transmission time of the uplink channel/signal and the transmission time of the CSI-RS exceeds a specific value, a QCL relationship for a spatial Rx parameter with a default reference resource may be configured for the resource of the CSI-RS.

The above-described step of FIG. 9 may be implemented by a first device 100 and a second device 200 of FIG. 12 or a vehicle 100 of FIG. 13 to be described below. A UE may be implemented with a first device 100, and a network may be implemented with a second device 200, and vice versa. For example, referring to FIG. 12, one or more processors 102/202 may control one or more transceivers 106/206 and/or one or more memories 104/204, etc. to receive configuration/indication information related to a CSI resource/measurement/reporting, and the one or more transceivers 106/206 may receive configuration/indication information related to a CSI resource/measurement/reporting from a network.

A UE receives a CSI-RS from a network through one or more antenna ports (S904).

Here, a UE may receive a CSI-RS by applying a spatial Rx parameter with reference to resource information of an uplink channel/signal for configuring a reception beam for the CSI-RS. Alternatively, a UE may receive a CSI-RS by applying a spatial Rx parameter with reference to a default reference resource.

The above-described step of FIG. 9 may be implemented by a first device 100 and a second device 200 of FIG. 12 or a vehicle 100 of FIG. 13 to be described below. A UE may be implemented with a first device 100, and a network may implemented with a second device 200, and vice versa. For example, referring to FIG. 12, one or more processors 102/202 may control one or more transceivers 106/206 and/or one or more memories 104/204, etc. to receive a CSI-RS, and the one or more transceivers 106/206 may receive a CSI-RS from a network.

And, based on a CSI-RS received in step S904 and configuration/indication information received in step S903, CSI measurement is performed (i.e., CSI is generated) (S905).

Here, when a UE performs CSI measurement, it may be based on the above-described proposed methods (e.g., Embodiments 1/1-1/1-2).

As described above in Embodiment 1, a UE may perform (CSI generation) CSI (e.g., RI, PMI, etc.) measurement based on M specific DFT vectors configured from a network.

In addition, as described above, a UE may select (determine) M' (M≥M', M' is a natural number) DFT vectors from among M specific DFT vectors received (configured) from a base station, and may perform (CSI generation) CSI (e.g., RI, PMI, etc.) measurement based on the M' selected (determined) DFT vectors. In this case, a UE may transmit information on M' DFT vectors to a base station. Information on the M' DFT vectors may be transmitted to a base station together with CSI in step S906 to be described later, or may be transmitted to a base station before CSI reporting (i.e., before step S906).

A UE transmits a CSI report to a network based on a CSI measurement value (S906).

Here, as described in Embodiment 2 above, a UE does not transmit all CSI reports for multiple cells, and may transmit only CSI report for a specific cell among multiple cells to a network. Specifically, when a CSI report includes a first CSI report for a first cell and a second CSI report for a second cell, a report value for a wideband (WB) may be reported only in either the first CSI report or the second CSI report, and a report value for a subband (SB) may be reported in both the first CSI report and the second CSI report.

The above-described step of FIG. 9 may be implemented by a first device 100 and a second device 200 of FIG. 12 or a vehicle 100 of FIG. 13 to be described below. A UE may be implemented with a first device 100, and a network may be implemented with a second device 200, and vice versa. For example, referring to FIG. 12, one or more processors 102/202 may control one or more transceivers 106/206 and/or one or more memories 104/204, etc. to transmit a CSI report, and the one or more transceivers 106/206 may transmit a CSI report to a network.

Thereafter, a network may schedule and transmit data based on a CSI report value of a UE (S907).

Figure 10:
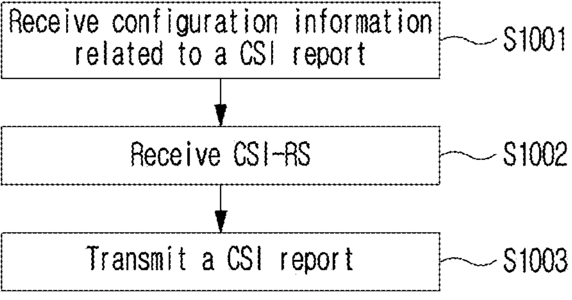
FIG. 10 is a diagram illustrating a method of transmitting channel state information according to an embodiment of the present disclosure.

FIG. 10 is a diagram illustrating a method of transmitting channel state information according to an embodiment of the present disclosure.

Each step of FIG. 10 described below may be implemented by a first device 100/second device of FIG. 12 or a vehicle 100 of FIG. 13 to be described later.

Referring to FIG. 10, a UE receives configuration information related to a CSI report from a base station (S1001).

Configuration information related to a CSI report may include information on the above-described proposed method (e.g., Embodiment 1/1-1/1-2).

For example, as described in Embodiment 1 above, configuration information related to a CSI report may include information on a value of M (M is a natural number) and/or M DFT vectors.

Here, a value of M and/or M DFT vectors may be selected/determined based on a delay value obtained from a uplink channel/signal estimated within N (N≥M, N is a natural number) DFT vector candidates. N may be determined based on a size of a band configured for a UE to report the CSI and an oversampling coefficient.

In addition, as described in Embodiment 1 above, the M DFT vectors may be configured/indicated by using a bitmap of size N corresponding to the N DFT vector candidates in the configuration information related to the CSI report. Alternatively, the M DFT vectors may be configured/indicated by using a bitmap of size P correspond to consecutive P (N≥P≥M, P is a natural number) DFT vector candidates among the N DFT vector candidates in the configuration information related to the CSI report. Alternatively, a starting point may be configured/indicated in the N DET candidates in the configuration information related to the CSI report, and the M DFT vectors may be determined as consecutive M DFT vectors starting from the starting point in the N DFT vector candidates.

In addition, as described in Embodiment 1-1 above, configuration information related to CSI report may include information on a value of M (M is a natural number) and/or M DFT vectors independently for each antenna port of a CSI-RS.

In addition, as described in Embodiment 1-2 above, in order to configure a reception beam for CSI-RS reception (e.g., a quasi co-location (QCL) relationship is configured for a spatial Rx parameter), resource information of an uplink channel/signal may be configured/indicated. The resource information of the uplink channel/signal for configuring the reception beam for the CSI-RS may be included in configuration information related to CSI report. Here, when an offset between the transmission n time of the uplink channel/signal and the transmission time of the CSI-RS exceeds a specific value, a QCL relationship for a spatial Rx parameter with a default reference resource may be configured for the resource of the CSI-RS.

A UE receives a CSI-RS from a base station (S1002).

Here, a UE may receive a CSI-RS by applying a spatial Rx parameter with reference to resource information of an uplink channel/signal for configuring a reception beam for the CSI-RS. Alternatively, a UE may receive a CSI-RS by applying a spatial Rx parameter with reference to a default reference resource.

A UE transmits a CSI report to a base station based on the configuration information and the CSI-RS (S1003).

Here, CSI may be generated based on a value of M and/or M DFT vectors.

Here, as described in Embodiment 2 above, a UE does not transmit all CSI reports for multiple cells, and may transmit only CSI report for a specific cell among multiple cells to a network. Specifically, when a CSI report includes a first CSI report for a first cell and a second CSI report for a second cell, a report value for a wideband (WB) may be reported only in either the first CSI report or the second CSI report, and a report value for a subband (SB) may be reported in both the first CSI report and the second CSI report.

In addition, as described above, a UE may select (determine) M' (M≥M', M' is a natural number) DFT vectors from among M specific DFT vectors received (configured) from a base station, and may perform (CSI generation) CSI (e.g., RI, PMI, etc.) measurement based on the M' selected (determined) DFT vectors. In this case, a UE may transmit information on M' DFT vectors to a base station. Information on the M' DFT vectors may be transmitted to a base station together with CSI in the step S1003, or may be transmitted to a base station before CSI reporting (i.e., before step S1003).

Figure 11:
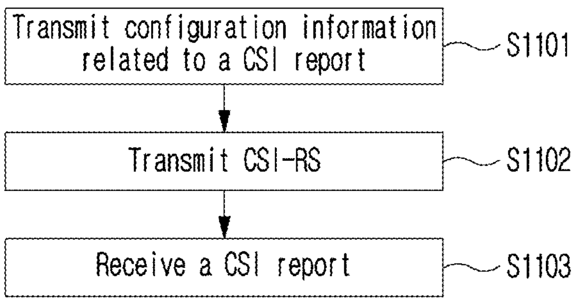
FIG. 11 is a diagram illustrating a method of receiving channel state information according to an embodiment of the present disclosure.

FIG. 11 is a diagram illustrating a method of receiving channel state information according to an embodiment of the present disclosure.

Each step of FIG. 11 described below may be implemented by a first device 100/second device of FIG. 12 to be described later.

Referring to FIG. 11, a base station transmits configuration information related to a CSI report to a terminal (S1101).

Configuration information related to a CSI report may include information on the above-described proposed method (e.g., Embodiment 1/1-1/1-2).

For example, as described in Embodiment 1 above, configuration information related to a CSI report may include information on a value of M (M is a natural number) and/or M DFT vectors.

Here, a value of M and/or M DFT vectors may be selected/determined based on a delay value obtained from a uplink channel/signal estimated within N (N≥M, N is a natural number) DFT vector candidates. N may be determined based on a size of a band configured for a UE to report the CSI and an oversampling coefficient.

In addition, as described in Embodiment 1 above, the M DFT vectors may be configured/indicated by using a bitmap of size N corresponding to the N DFT vector candidates in the configuration information related to the CSI report. Alternatively, the M DFT vectors may be configured/indicated by using a bitmap of size P correspond to consecutive P (N≥P≥M, P is a natural number) DFT vector candidates among the N DFT vector candidates in the configuration information related to the CSI report. Alternatively, a starting point may be configured/indicated in the N DFT vector candidates in the configuration information related to the CSI report, and the M DFT vectors may be determined as consecutive M DFT vectors starting from the starting point in the N DFT vector candidates.

In addition, as described in Embodiment 1-1 above, configuration information related to CSI report may include information on a value of M (M is a natural number) and/or M DFT vectors independently for each antenna port of a CSI-RS.

In addition, as described in Embodiment 1-2 above, in order to configure a reception beam for CSI-RS reception (e.g., a quasi co-location (QCL) relationship is configured for a spatial Rx parameter), resource information of an uplink channel/signal may be configured/indicated. The resource information of the uplink channel/signal for configuring the reception beam for the CSI-RS may be included in configuration information related to CSI report. Here, when an offset between the transmission time of the uplink channel/signal and the transmission time of the CSI-RS exceeds a specific value, a QCL relationship for a spatial Rx parameter with a default reference resource may be configured for the resource of the CSI-RS.

A base station transmits a CSI-RS (CSI-reference signal) to a UE (S1102).

A base station receives a CSI report based on the configuration information and the CSI-RS from a UE (S1103).

Here, CSI may be generated based on a value of M and/or M DFT vectors.

Here, as described in Embodiment 2 above, a UE does not transmit all CSI reports for multiple cells, and may transmit only CSI report for a specific cell among multiple cells to a network. Specifically, when a CSI report includes a first CSI report for a first cell and a second CSI report for a second cell, a report value for a wideband (WB) may be reported only in either the first CSI report or the second CSI report, and a report value for a subband (SB) may be reported in both the first CSI report and the second CSI report.

In addition, as described above, a UE may select (determine) M' (M≥M', M' is a natural number) DFT vectors from among M specific DFT vectors received (configured) from a base station, and may perform (CSI generation) CSI (e.g., RI, PMI, etc.) measurement based on the M' selected (determined) DFT vectors. In this case, a base station may receive information on M' DFT vectors from a UE. Information on the M' DFT vectors may be transmitted from a UE together with CSI in the step S1103, or may be transmitted from a UE before CSI reporting (i.e., before step S1103).

General Device to which the Present Disclosure May Be Applied

Figure 12:
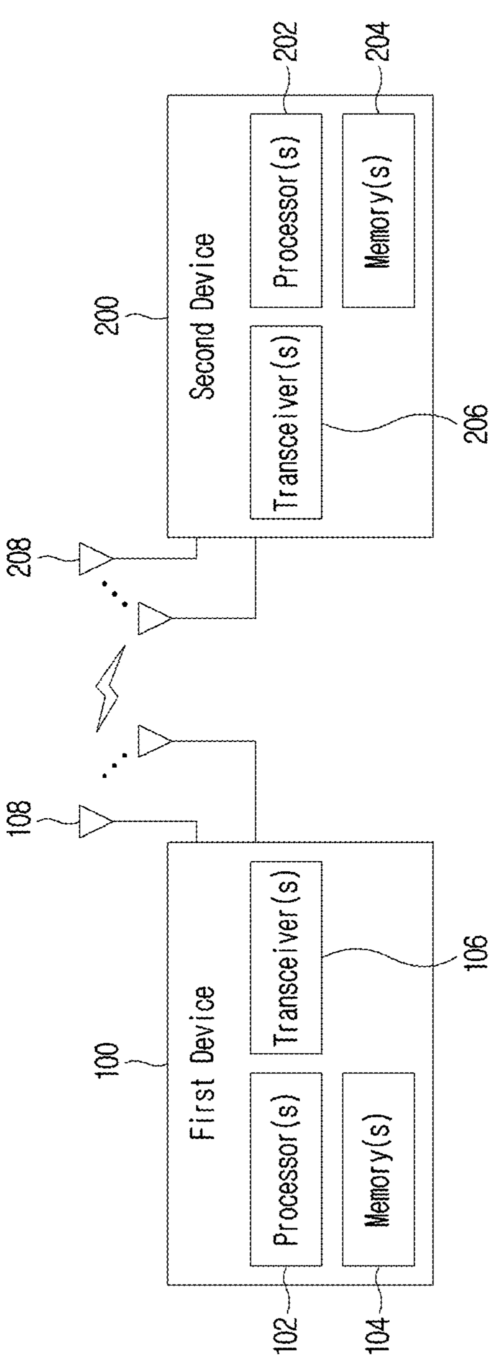
FIG. 12 is a diagram which illustrates a block diagram of a wireless communication device according to an embodiment of the present disclosure.

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive data, control user information, a wireless signal/channel, etc. mentioned description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Figure 13:
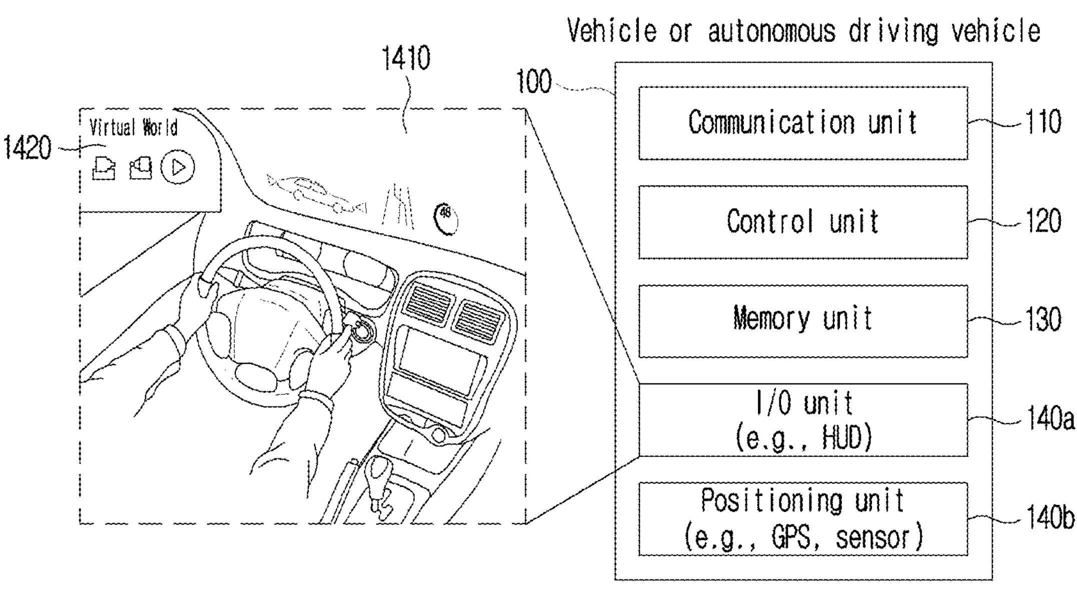
FIG. 13 illustrates a vehicle device according to an embodiment of the present disclosure.

FIG. 13 illustrates a vehicle device according to an embodiment of the present disclosure.

In reference to FIG. 13, a vehicle 100 may include a communication unit 110, a control unit 120, a memory unit 130, an input and output unit 140*a* and a positioning unit 140*b*.

A communication unit 110 may transmit and receive a signal (e.g., data, a control signal, etc.) with external devices of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140*a* may output an AR/VR object based on information in a memory unit 130. An input and output unit 140*a* may include HUD. A positioning unit 140*b* may obtain position information of a vehicle 100. Position information may include absolute position information, position information in a driving lane, acceleration information, position information with a surrounding vehicle, etc. of a vehicle 100. A positioning unit 140*b* may include a GPS and a variety of sensors.

In an example, a communication unit 110 of a vehicle 100 may receive map information, traffic information, etc. from an external server and store them in a memory unit 130. A positioning unit 140*b* may obtain vehicle position information through a GPS and a variety of sensors and store it in a memory unit 130. A control unit 120 may generate a virtual object based on map information, traffic information and vehicle position information, etc. and an input and output unit 140*a* may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140*a*. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (LOW Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a terminal, configuration information related to a channel state information (CSI) report from a base station;

receiving, by the terminal, a CSI-RS (CSI-reference signal) from the base station; and transmitting, by the terminal, to the base station, a CSI report based on the configuration information and the CSI-RS, wherein the configuration information includes information for M vectors available for determining a precoding matrix, wherein M is an integer greater than 0, wherein the M vectors are selected from N vector candidates based on a delay value estimated, by the base station, from an uplink transmission of the terminal, wherein N is an integer greater than 0 and greater than or equal to M, wherein the N is determined based on a size of a bandwidth configured for the CSI report and an oversampling coefficient, wherein the CSI report includes a precoding matrix indicator (PMI) indicating the precoding matrix determined based on the M vectors, wherein the CSI report includes a first CSI report for a first cell and a second CSI report for a second cell, and wherein a report value for wideband is reported only in either one of the first CSI report or the second CSI report, and a report value for a subband is reported in both the first CSI report and the second CSI report.

2. The method of claim 1, wherein, in the configuration information, the M vectors are configured using a bitmap of size N corresponding to the N vector candidates.

3. The method of claim 1, wherein, in the configuration information, the M vectors are configured using a bitmap of size P corresponding to continuous P (N≥P≥M, P is a natural number) vector candidates among the N vector candidates.

4. The method of claim 1, wherein a starting point is configured in the N vector candidates in the configuration information, wherein the M vectors are determined as continuous M vectors starting from the starting point in the N vector candidates.

5. The method of claim 1, wherein the M vectors are independently configured for each antenna port of the CSI-RS in the configuration information.

6. The method of claim 1, wherein a quasi co-location (QCL) relationship for a spatial Rx parameter with a resource of an uplink channel/signal is configured for a resource of the CSI-RS, wherein the uplink channel/signal is any one of a sounding reference signal (SRS), a physical uplink control channel (PUCCH) or a physical uplink shared channel (PUSCH).

7. The method of claim 6, wherein, when an offset between a transmission time of the uplink channel/signal and a transmission time of the CSI-RS exceeds a specific value, a QCL relationship for a spatial Rx parameter with a default reference resource is configured for the resource of the CSI-RS.

8. The method of claim 1, wherein the CSI report is generated based on M' (M≥M', M' is a natural number) vectors selected by the terminal from among the M vectors.

9. The method of claim 8, further comprising:

transmitting information for the M' vectors to the base station.

10. A terminal comprising:

at least one transceiver for transmitting and receiving a wireless signal; and at least one processor for controlling the at least one transceiver, wherein the at least one processor configured to:

receive configuration information related to a channel state information (CSI) report from a base station;

receive a CSI-RS (CSI-reference signal) from the base station; and transmit, to the base station, a CSI report based on the configuration information and the CSI-RS, wherein the configuration information includes information for M vectors available for determining a precoding matrix, wherein M is an integer greater than 0, wherein the M vectors are selected from N vector candidates based on a delay value estimated, by the base station, from an uplink transmission of the terminal, wherein Nis an integer greater than 0 and greater than or equal to M, wherein the N is determined based on a size of a bandwidth configured for the CSI report and an oversampling coefficient, wherein the CSI report includes a precoding matrix indicator (PMI) indicating the precoding matrix determined based on the M vectors, wherein the CSI report includes a first CSI report for a first cell and a second CSI report for a second cell, and wherein a report value for wideband is reported only in either one of the first CSI report or the second CSI report, and a report value for a subband is reported in both the first CSI report and the second CSI report.

11. The terminal of claim 10, wherein the M vectors are independently configured for each antenna port of the CSI-RS in the configuration information.

12. The terminal of claim 10, wherein a quasi co-location (QCL) relationship for a spatial Rx parameter with a resource of an uplink channel/signal is configured for a resource of the CSI-RS, wherein the uplink channel/signal is any one of a sounding reference signal (SRS), a physical uplink control channel (PUCCH) or a physical uplink shared channel (PUSCH).

13. The terminal of claim 10, wherein the CSI report is generated based on M' (M≥M', M' is a natural number) vectors selected by the terminal from among the M vectors.

14. The terminal of claim 13, wherein the processor configured to transmit information for the M' vectors to the base station.

15. A base station comprising:

at least one transceiver for transmitting and receiving a wireless signal; and at least one processor for controlling the at least one transceiver, wherein the at least one processor configured to:

transmit configuration information related to a channel state information (CSI) report to a terminal;

transmit a CSI-RS (CSI-reference signal) from to the terminal; and receive, from the terminal, a CSI report based on the configuration information and the CSI-RS, wherein the configuration information includes information for M vectors available for determining a precoding matrix, wherein M is an integer greater than 0, wherein the M vectors are selected from N vector candidates based on a delay value estimated, by the base station, from an uplink transmission of the terminal, wherein N is an integer greater than 0 and greater than or equal to M, wherein the N is determined based on a size of a bandwidth configured for the CSI report and an oversampling coefficient, wherein the CSI report includes a precoding matrix indicator (PMI) indicating the precoding matrix determined based on the M vectors, wherein the CSI report includes a first CSI report for a first cell and a second CSI report for a second cell, and wherein a report value for wideband is reported only in either one of the first CSI report or the second CSI report, and a report value for a subband is reported in both the first CSI report and the second CSI report.

* * * * *